(12) United States Patent
Goecke et al.

(10) Patent No.: US 12,157,653 B2
(45) Date of Patent: Dec. 3, 2024

(54) MACHINES AND METHODS TO APPLY TAPE TO A SURFACE

(71) Applicant: ShieldMark, Inc., Rocky River, OH (US)

(72) Inventors: Adam Goecke, Rocky River, OH (US); Andrew Goecke, Chicago, IL (US); Alec Goecke, Rocky River, OH (US); Curtis Taylor, Chagrin Falls, OH (US)

(73) Assignee: ShieldMark, Inc., Rocky River, OH (US)

( * ) Notice: Subject to any disclaimer, the term of this patent is extended or adjusted under 35 U.S.C. 154(b) by 0 days.

(21) Appl. No.: 18/132,574

(22) Filed: Apr. 10, 2023

(65) Prior Publication Data
US 2023/0242368 A1     Aug. 3, 2023

Related U.S. Application Data

(62) Division of application No. 16/735,602, filed on Jan. 6, 2020, now Pat. No. 11,623,840.

(51) Int. Cl.
    *B32B 43/00*        (2006.01)
    *B29C 65/50*        (2006.01)
    *B65H 35/00*      (2006.01)

(52) U.S. Cl.
    CPC ....... *B65H 35/004* (2013.01); *B29C 65/5092* (2013.01); *B29C 65/50* (2013.01); *B32B 43/006* (2013.01); *Y10T 156/1174* (2015.01); *Y10T 156/1195* (2015.01); *Y10T 156/1978* (2015.01); *Y10T 156/1994* (2015.01)

(58) Field of Classification Search
    CPC ............ B32B 43/006; Y10T 156/1195; Y10T 156/1994; B29C 65/48; B29C 65/50; B29C 65/5092; B29C 66/4722
    See application file for complete search history.

(56) References Cited

U.S. PATENT DOCUMENTS

| | | | |
|---|---|---|---|
| 2,845,041 | A | 7/1958 | Karn |
| 3,551,262 | A | 12/1970 | Kelly |
| 4,089,730 | A | 5/1978 | Mahn |
| 4,640,539 | A | 2/1987 | La Porte |
| 4,826,562 | A | 5/1989 | Ehlis |
| 5,009,739 | A | 4/1991 | Goodwin et al. |
| 5,038,492 | A | 8/1991 | Bryant et al. |

(Continued)

*Primary Examiner* — Philip C Tucker
*Assistant Examiner* — Nickolas R Harm
(74) *Attorney, Agent, or Firm* — FisherBroyles, LLP; W. Scott Harders

(57) ABSTRACT

A machine to apply tape to a surface includes a handle for manipulation by a user connected to a wheeled applicator allowing the tape to be dispensed from the applicator and rolled onto a surface. The applicator includes two sidewalls adjustable relative to each other on guide bars to define space therebetween where rolls of tape having different widths can be accommodated. The sidewalls further include bottom portions shaped complimentarily with the wheel to define a path sized for a width of the tape around the wheel, and where the sidewalls further define a path sized for the width of the tape over at least one guide bar. The applicator also may include a clutched take-up reel operatively connected to the wheel, where rotation of the wheel causes the take-up reel to rotate and collect a liner.

4 Claims, 15 Drawing Sheets

(56) References Cited

U.S. PATENT DOCUMENTS

| | | | |
|---|---|---|---|
| 5,342,466 A * | 8/1994 | Eidson | E04F 21/165 |
| | | | 156/577 |
| 5,641,378 A | 6/1997 | Luhman et al. | |
| 6,684,926 B2 | 2/2004 | Matechuk | |
| 6,883,292 B1 | 4/2005 | Chen | |
| 7,845,382 B1 | 12/2010 | Melino, Sr. et al. | |
| 7,886,800 B2 | 2/2011 | Skoczylas | |
| 10,753,107 B2 | 8/2020 | Mort et al. | |
| 2005/0028941 A1 | 2/2005 | Flowers | |
| 2005/0056378 A1 | 3/2005 | Schwertfeger | |
| 2005/0178507 A1 | 8/2005 | Hajny et al. | |
| 2007/0125474 A1 | 6/2007 | Barker et al. | |
| 2013/0186570 A1 | 7/2013 | Doniger et al. | |
| 2016/0376792 A1 | 12/2016 | Danielson | |
| 2019/0161979 A1 | 5/2019 | Mort et al. | |
| 2021/0094790 A1 | 4/2021 | Fleet et al. | |

* cited by examiner

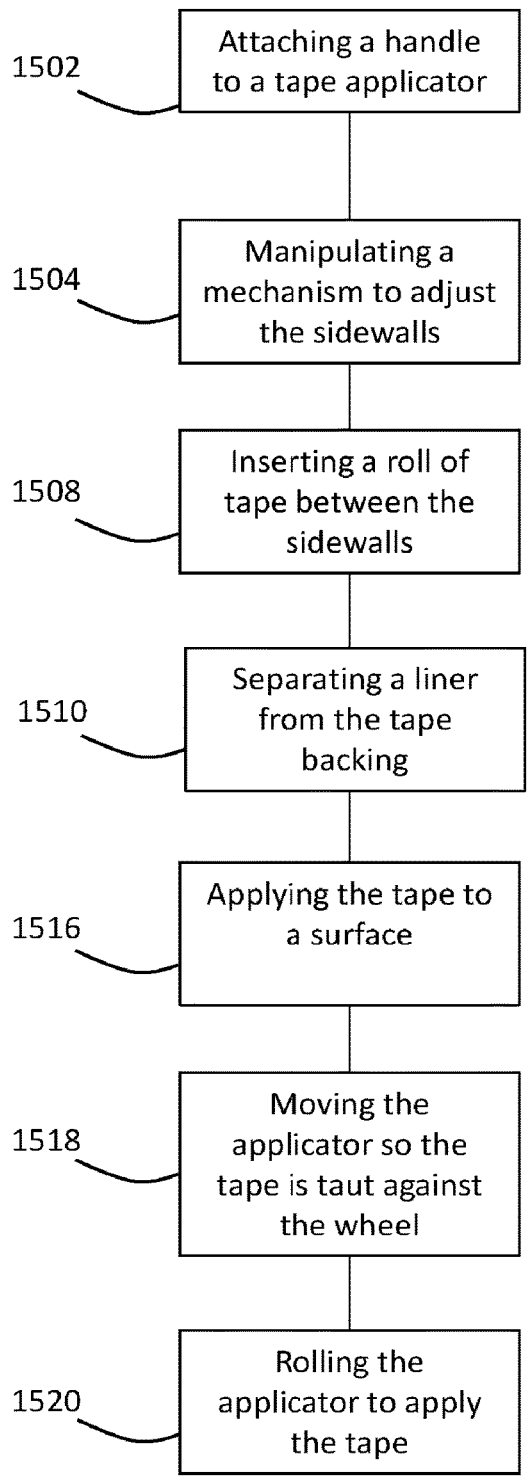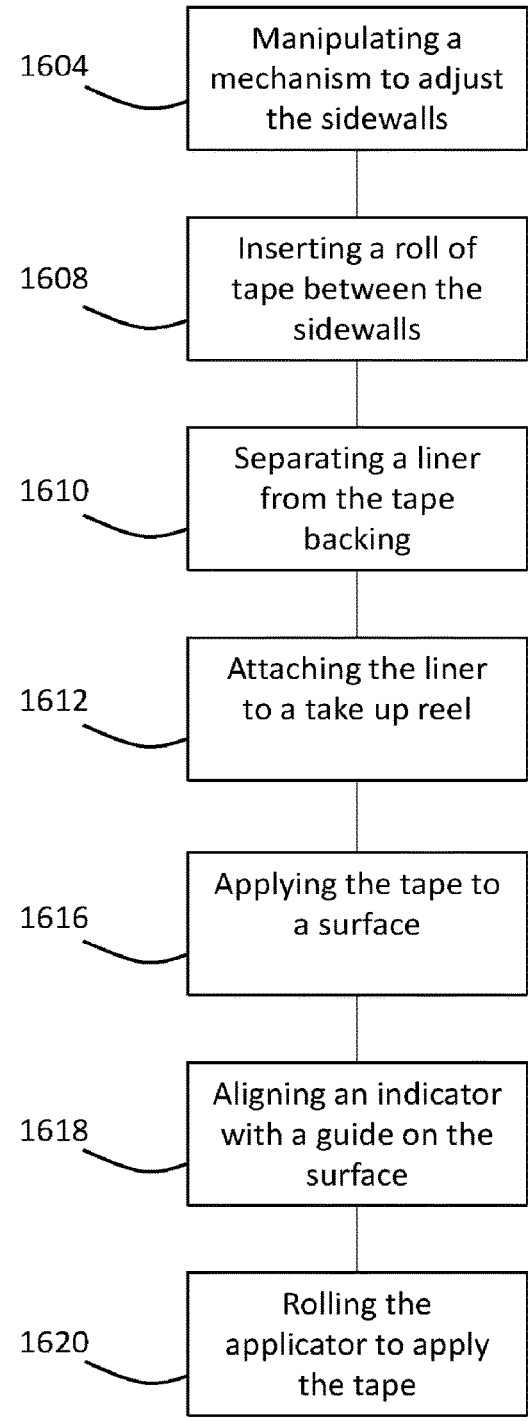
Fig. 15
Fig. 16

MACHINES AND METHODS TO APPLY TAPE TO A SURFACE

CROSS REFERENCE TO RELATED APPLICATIONS

This application is a division of U.S. application Ser. No. 16/735,602, filed Jan. 6, 2020, the entire contents of which are incorporated herein by reference.

This disclosure is directed to the field of tape or pressure sensitive adhesive material placement on a surface. It finds application, among others, in the placement of floor marking tapes of varying dimensions in roll form onto a surface. Aspects include a take-up roll for collection of a protective lining substrate often used to protect the adhesive in those instances where such liners are used. Other aspects will be discussed below.

SUMMARY

Systems and methods are disclosed herein for economically applying floor tape, and indeed, most types of tapes, for example, masking tapes, painter's tapes, duct tape, packing tape—all of varying widths—to a surface, such as a floor.

These illustrative features are mentioned not to limit or define the disclosure, but to provide examples to aid understanding thereof. Additional embodiments are discussed in the Detailed Description, and further description is provided there.

DESCRIPTION OF THE FIGURES

These and other features, embodiments, and advantages of the present disclosure are better understood when the following Detailed Description is read with reference to the accompanying drawings.

FIG. 15 shows a method of applying a tape.
FIG. 16 shows a method of applying a tape.

DETAILED DESCRIPTION

This disclosure describes techniques and methods that enable factory owners, for example, to maintain operations within the facility or an area of the facility during re-striping or reconfiguring where floor markings designating aisleways, hazardous areas, loading/storage areas and the like are located. Previously, such areas required facility shut down or severely impaired production while old painted lines were removed and new lines were painted. Additionally, marking tapes can be heavy and cumbersome to apply alone necessitating a simple applicator that is both sturdy enough to support a marking tape. Other uses include the ability to apply marking tapes atop or in combination with a magnetic or other guidance strip that may facilitate automated devices, robots and the like to successfully navigate a factory or other environment having such marking tapes. Marking tapes may be either laid in separately from, or combined with and applied simultaneously with the guidance strip.

In one example, rolls of durable tape may be economically applied to designate pedestrian walkways, fork-lift or other trafficways, and outline hazardous areas where equipment may be operating or materials may be stored. These durable tape markings may be applied quickly and while full factory operations are underway.

In another example, rolls of tape may be applied as borders for areas where painting is desired. For example, boundary lines may be quickly and economically laid in straight, curved, or lines of any contour to define lateral edges of a floor space where painted is to be applied in between.

In another example, rolls of tape may be applied in parking lots, vehicle traffic areas, sidewalks and the like to define parking spaces, drive lanes, walkways, etc.

Figure 1:
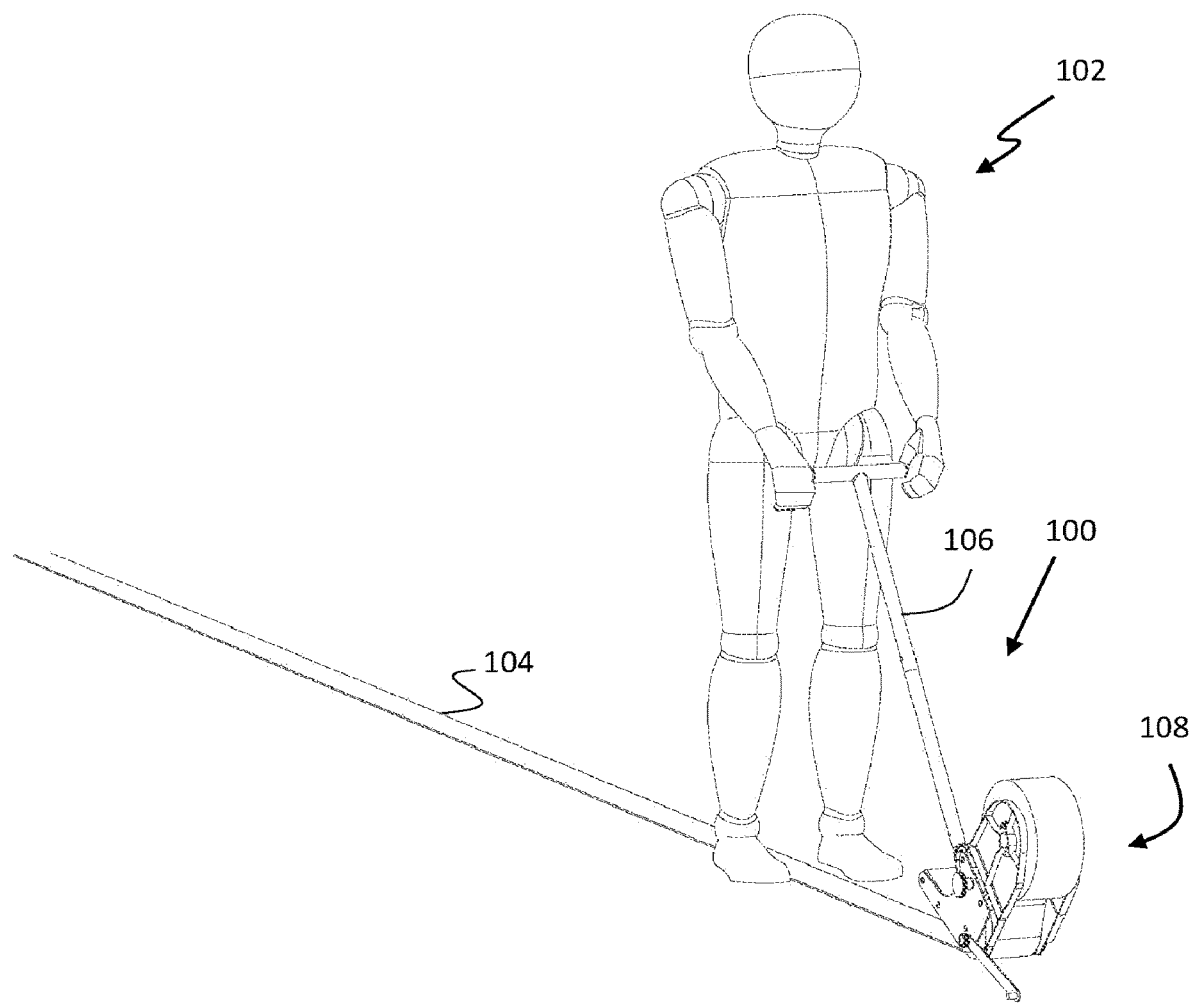
FIG. 1 is a view of a user operating a machine to apply tape to a surface.

Referring now to FIG. 1, a push propelled device 100 is shown being operated by a user 102 to apply an adhesive tape 104 to a surface. The adhesive tape can be durable, polymeric tapes with liners such as MightyLine® brand tapes commercially available at https://mightylinetape.com/, and other tapes without liners such as masking tapes, painting tapes, duct tapes and the like.

As will be further discussed below, the device 100 includes a handle 106 attached to a tape applicator 108. The handle 106 can be permanently affixed to the applicator 108, however for economical storage the handle is preferably both removable from the applicator 108 and separable into two or more sections.

Figure 2:
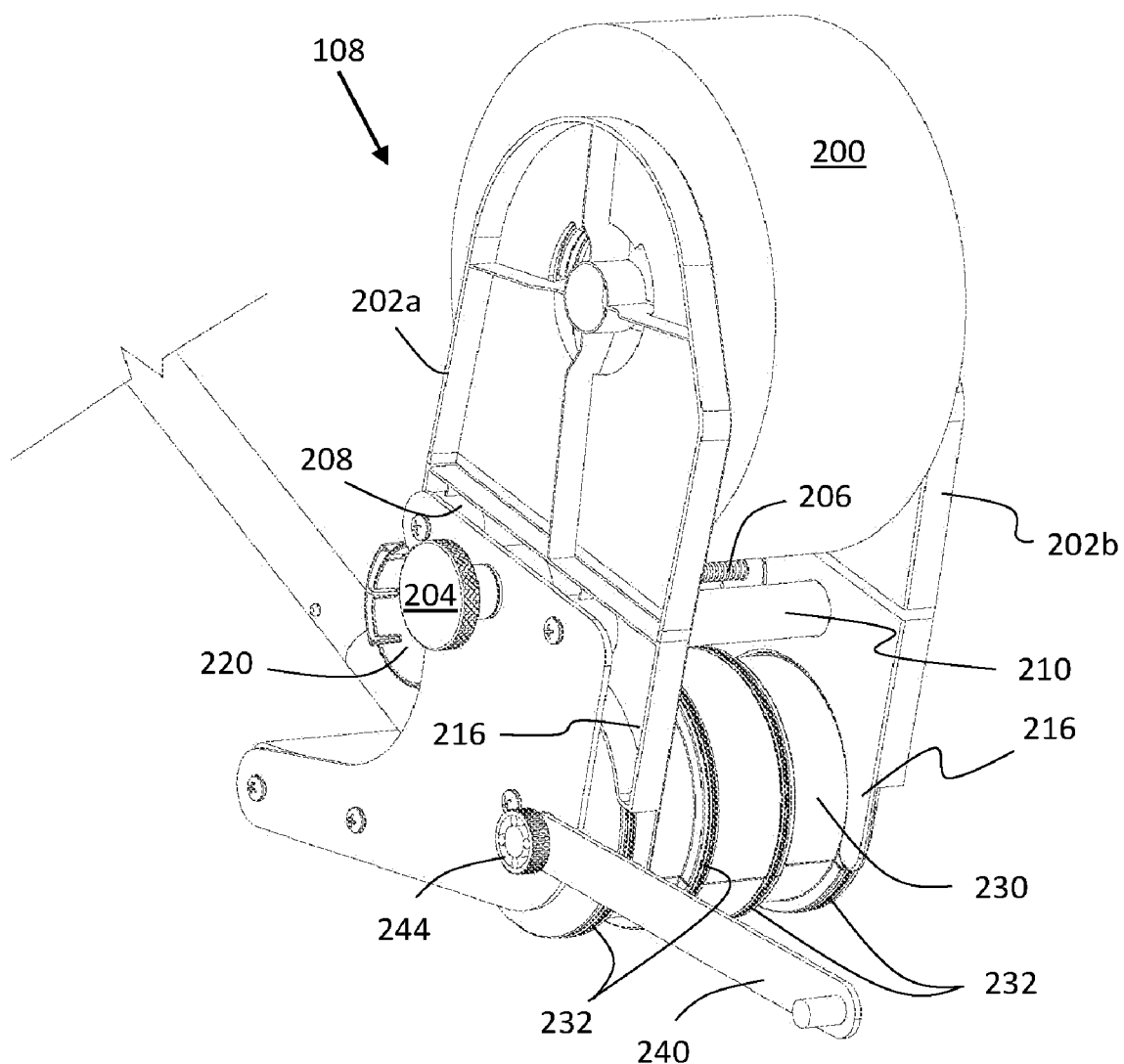
FIG. 2 is an enlarged view of a machine to apply tape to a surface with a roll of tape installed.

With reference now to FIG. 2, the tape applicator 108 supports a roll 200 of tape between two sidewalls 202a, 202b. In one embodiment, the sidewalls are adjusted by a turning knob 204 which actuates a screw drive 206 that connects to both sidewalls 202 and moves them apart or toward each other depending on rotation direction along guide bars 208, 210. Other mechanisms to position the sidewalls are envisioned including moving only one side wall and mechanisms to fix the sidewall(s) in place with pins, detents, clips, electromechanical actuators and the like. As will be further discussed below, in certain arrangements, guide bar 210 may also act as part of a path travelled by a tape as it comes off a roll 200. In cases where the tape includes a protective liner (not shown), the tape backing and protective liner can be separated as the tape passes over guide bar 210 for protective liner take up on a take-up reel 220 while the tape backing is applied to a surface.

Device 100 also includes at least one wheel 230 having elastomeric or other suitable bands 232 around a circumference of the wheel 230 at select locations. The bands 232 facilitate tracking of the applicator on the surface as well as providing friction to feed the tape off the roll 200 and onto the floor or other surface. While FIG. 2 includes four bands 232, other embodiments can include differing numbers of bands including a continuous sleeve covering or partially covering the surface of the wheel 230. In other embodiments, the two, opposite, outermost bands contact the flooring surface allowing tapes to pass therebetween which improves straight line tape installations while thinner inner bands contact the tape passing around the wheel.

Figure 3:
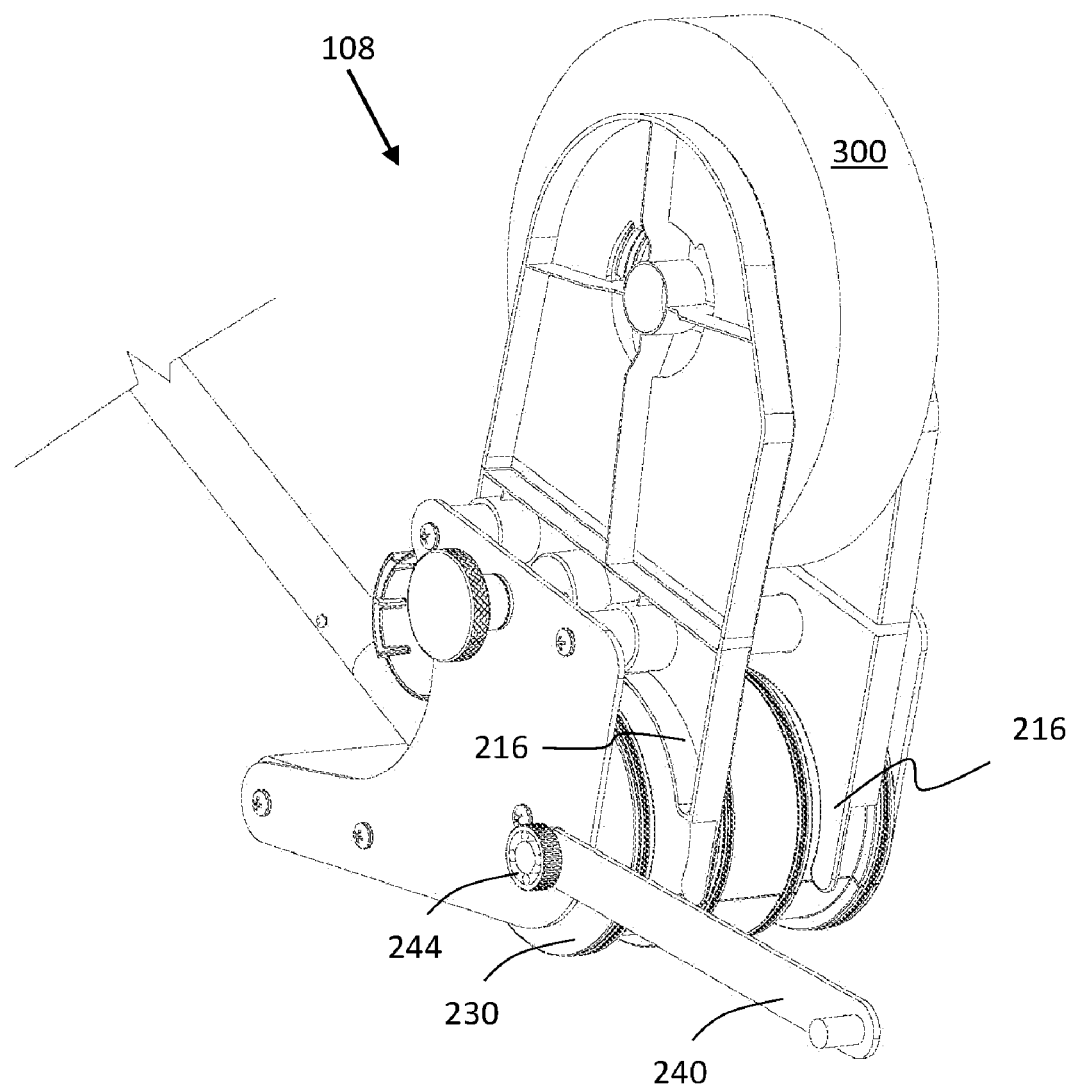
FIG. 3 is an enlarged view of a machine to apply tape to a surface with a roll of tape installed.

Comparing FIGS. 2 and 3 best illustrates a guiding feature of the adjustable sidewalls 202 depending on the width of the roll of tape. As an example, assuming roll 200 has a width of four inches, bottom portions 216 of the sidewalls 202 are complimentarily shaped to, and partially encircle the wheel 230 defining a path for the tape over the wheel of four inches. FIG. 3, in contrast, shows as an example roll 300 with a width of two inches and the bottom portions 216 of the sidewalls 202 defining a path for the tape over the wheel of two inches.

Figure 4:
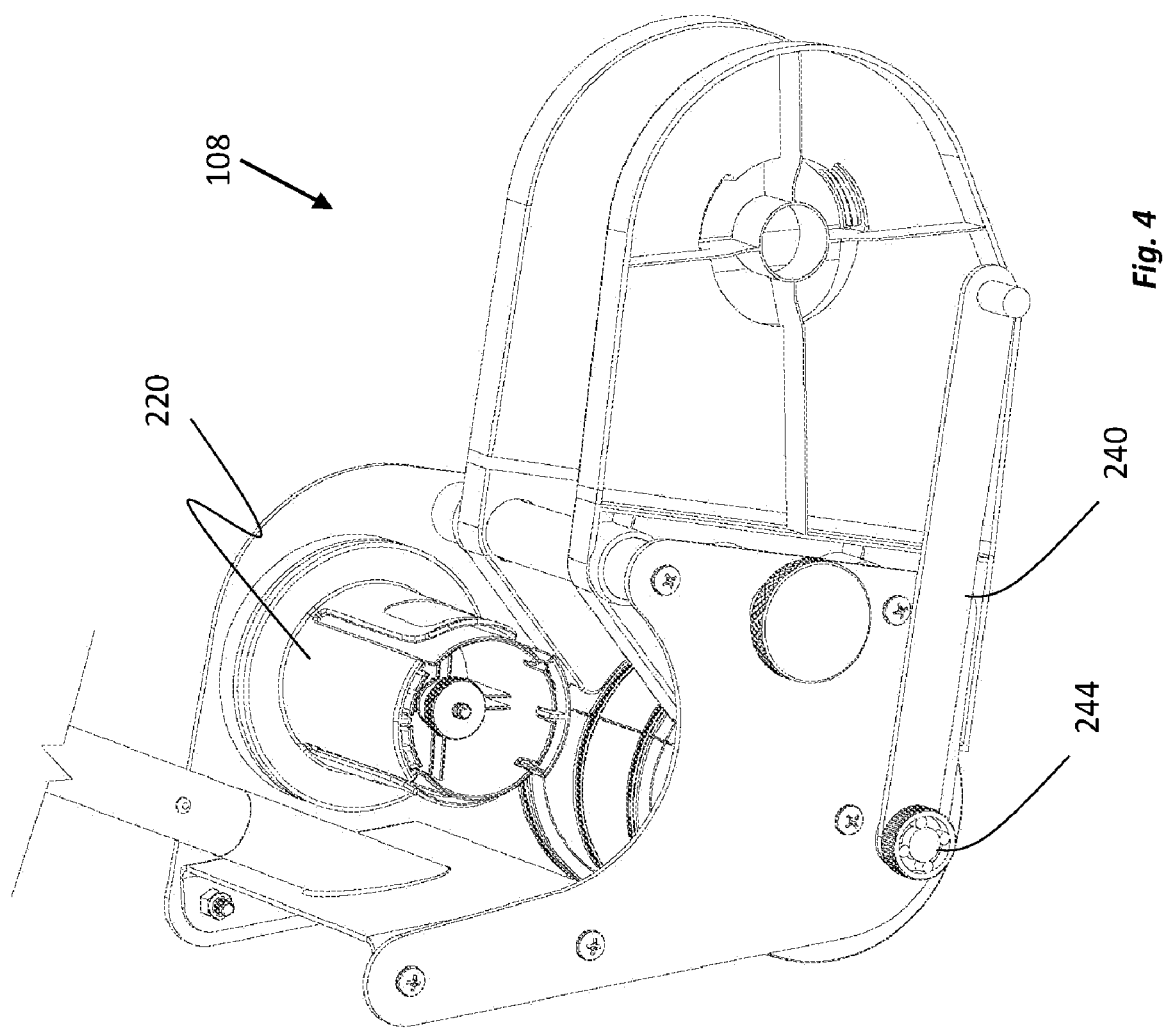
FIG. 4 is an enlarged top, right-side elevational view of a machine to apply tape to a surface.

FIGS. 2, 3 and 4 also show an indicator 240 movably connected to the applicator 108. While the indicator is shown on the right side of the applicator 108, it can be alternately mounted on the left side if desirable for a guide on that side. Indicator 240 rotates around a connection point 244 between a stored position (FIG. 4) and an extended position (FIGS. 2 and 3) in front of the applicator to indicate an approximate location on the surface where the tape backing will be applied. In other uses a guide on the floor surface may be aligned with the indicator to assist in application of tape in a desired position on the surface. Examples of guides include, a user snapped chalk line; a laser path; an existing seam, painted or taped line on the floor; or other mechanisms to be referenced by the indicator 240 to ensure tape application in the desired location.

Figure 5:
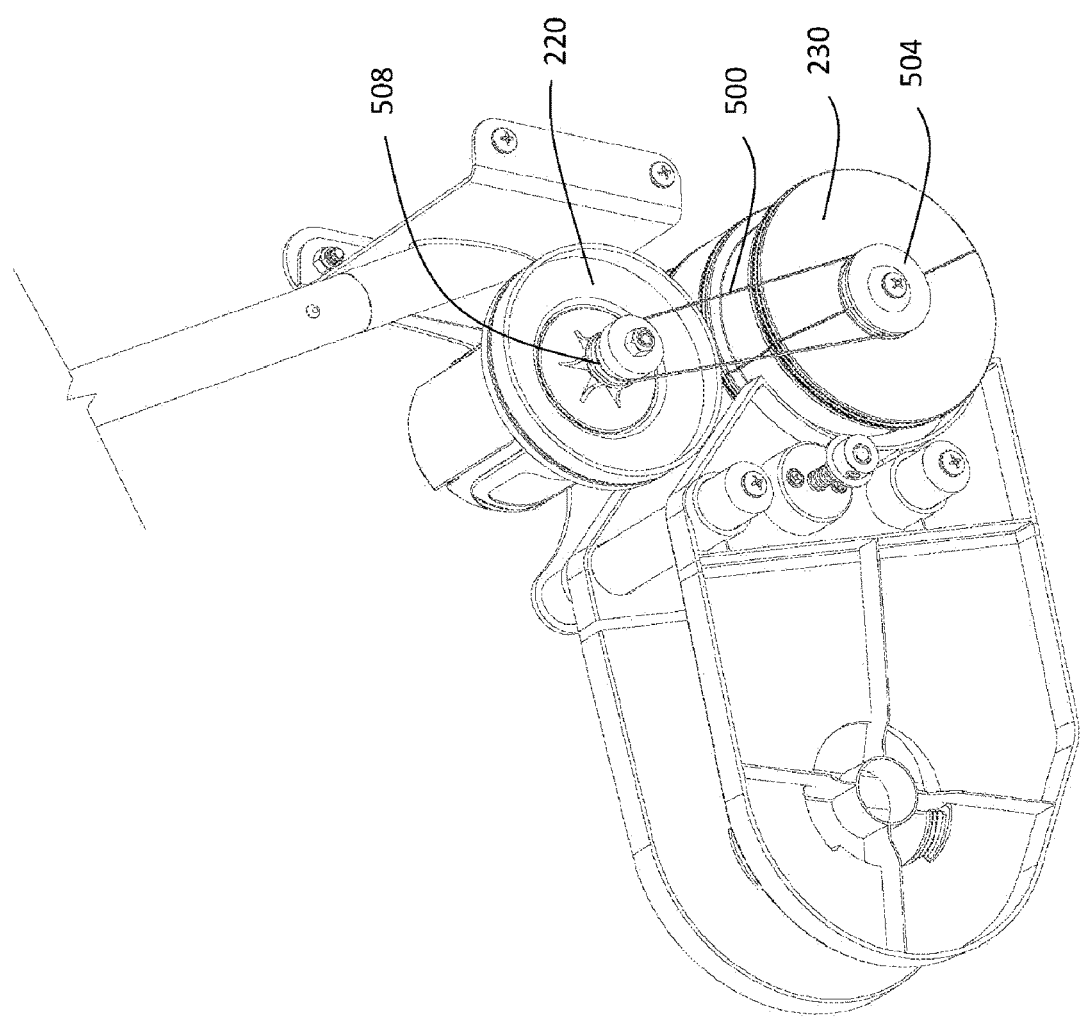
FIG. 5 is an enlarged top, left-side elevational view of a machine to apply tape to a surface with the left side panel removed.

Referring now to FIG. 5, a left side view of the applicator is shown with a side panel removed to show one embodiment of the rotational coupling of the wheel 230 and the take-up reel 220. In the illustrated embodiment, a belt 500 engages a driving wheel 504 connected to the wheel 230 and turning as the wheel moves along the surface. The belt also engages a clutch drive 508 connected to and rotating the take-up reel 220. In other embodiments, a chain drive can be substituted. In still other embodiments, electrical sensor and motors can be substituted, where a motor on the take-up reel turns as to take up the liner when the wheel is rotating in a forward direction and where the motor on the take-up reel stops when the wheel is stopped or rotating in a rearward direction.

Figure 6:
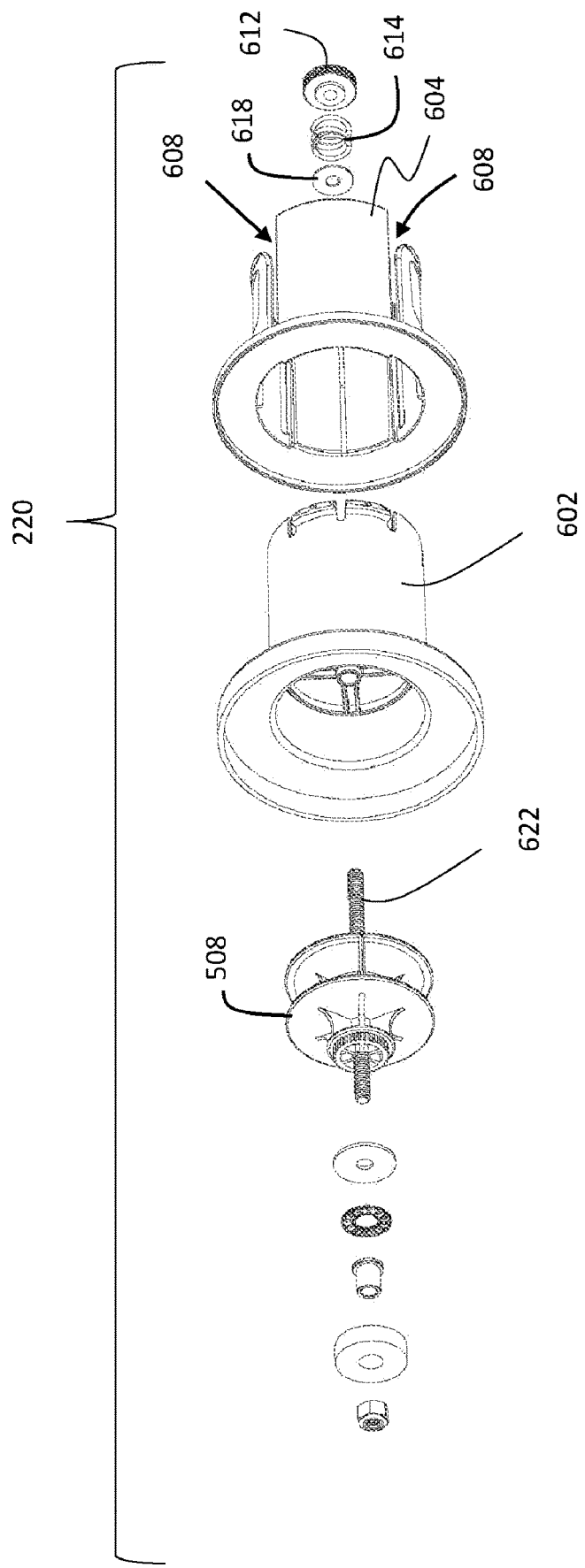
FIG. 6 is an exploded view of an embodiment of a take-up reel and clutch assembly.

FIG. 6 illustrates an exploded view of the take-up reel 220 assembly. The assembly includes an inner sleeve 602 coupled to an outer sleeve 604, where the outer sleeve 604 includes lengthwise slits 608 to receive an end of the liner after separation from the tape backing. In one embodiment, the outer sleeve 604 may slide off of, or slide at least partially away from the inner sleeve 602 to facilitate removal of collected liner wrappings after application of floor tape to the floor surface. Additionally, the take-up reel 220 acts as an adjustable clutch that variably slips or allows differential rotational speed of the take-up reel 220 as compared with the rotation of the wheel 230 (FIG. 5). In use, an operator adjusts the clutch thumb fastener 612 to adjust the take-up rate. In one example, tightening the fastener 612 decreases the slip and increases the take up rate by compressing spring 614 onto clutch washer 618 which compresses the mechanism along threaded shaft 622 extending from the clutch drive 508. Adjustment of the clutch drive accommodates variations in take-up speed of the liner and the application of the floor marking tape.

Figure 7:
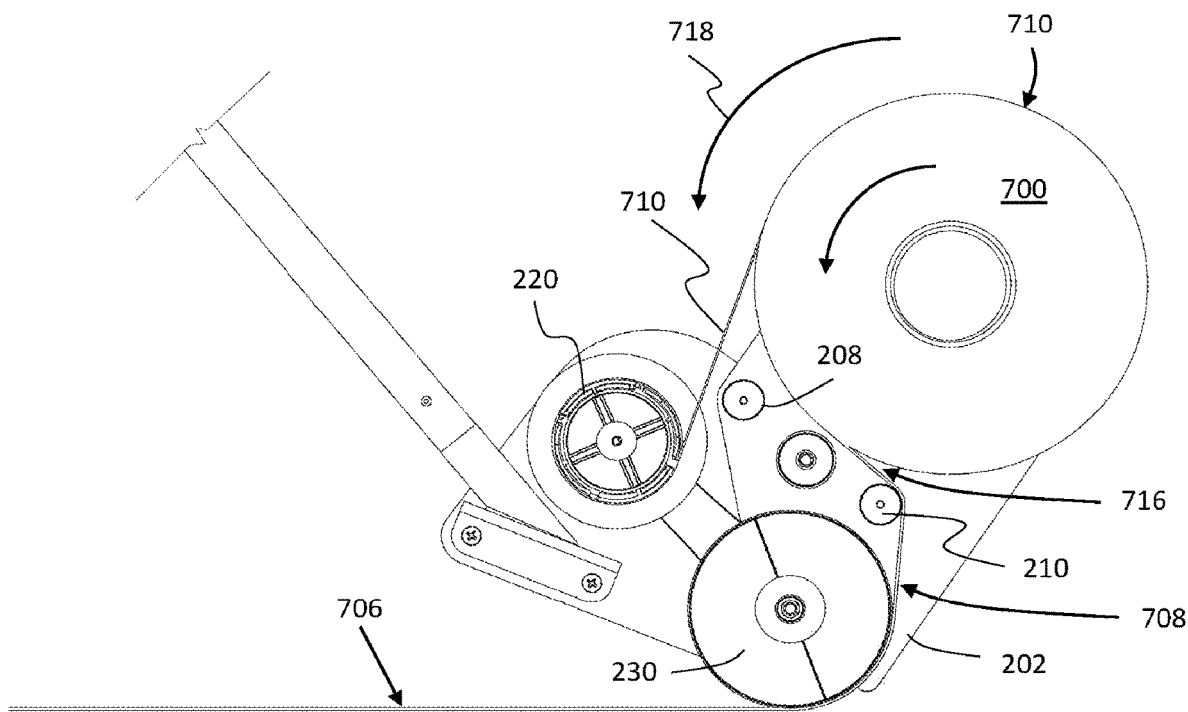
FIG. 7 is a right side view with right side cover and arm removed showing the take-up reel and a typical roll of tape (tape face on top, removable liner on bottom).

FIG. 7 shows a right side view with the right side sidewall and right side frame of the applicator removed to permit view of one embodiment of a path for tape backing and liner. Roll 700 includes a polymer tape backing with the finish side 706 outward on the roll 700. Adhesive side 708 is at least partially covered by a protective liner 710 until approximately location 716 where the liner is separated from the tape and is wrapped in the direction of arrow 718 and onto take-up reel 220. At about the same location 716, the tape backing is contained within the sidewalls 202 preventing drift or other lateral variation and routed over guide bar 210. From guide bar 210, the tape with the liner removed continues to be contained by sidewalls 202 and passes along a path to wheel 230 for application onto the flooring surface.

Figure 8:
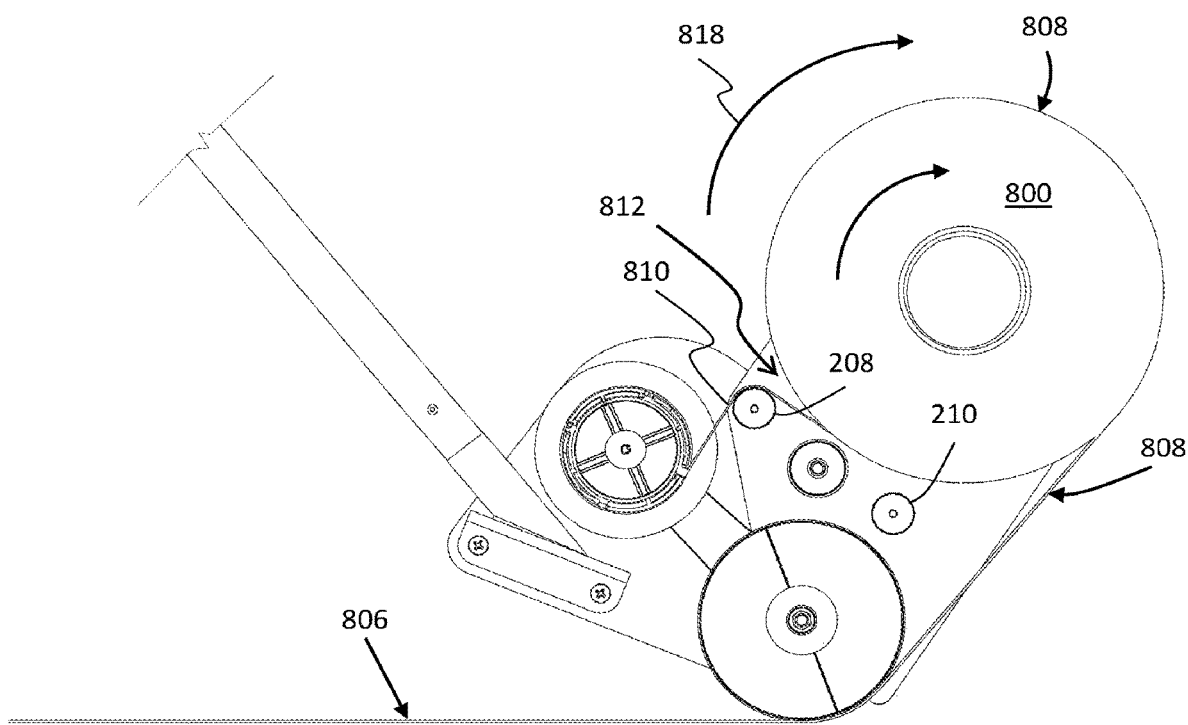
FIG. 8 is a right side view with right side cover and arm removed showing the take-up reel and an alternate roll of tape (removable liner on top, tape on bottom).

FIG. 8 shows a right side view with the right side sidewall and right side frame of the applicator removed to permit view of another embodiment of a path for tape backing and liner. Roll 800 includes a polymer tape backing with the finish side 806 inward on the roll 800 and the adhesive side 808 outward facing on the roll 800 and protected by liner 810 prior to application to the floor. In this embodiment, the roll 800 also rotates in a clockwise fashion and the liner 810 is removed and started on take-up reel 220 from the lower side of the roll at about the position 812. As depicted, liner 810 is routed over guide bar 208 onto the take-up reel 220. The then linerless tape backing continues around in direction of arrows 818 and is contained by sidewalls 202 at least through the path to wheel 230 for application onto the flooring surface.

Figure 9:
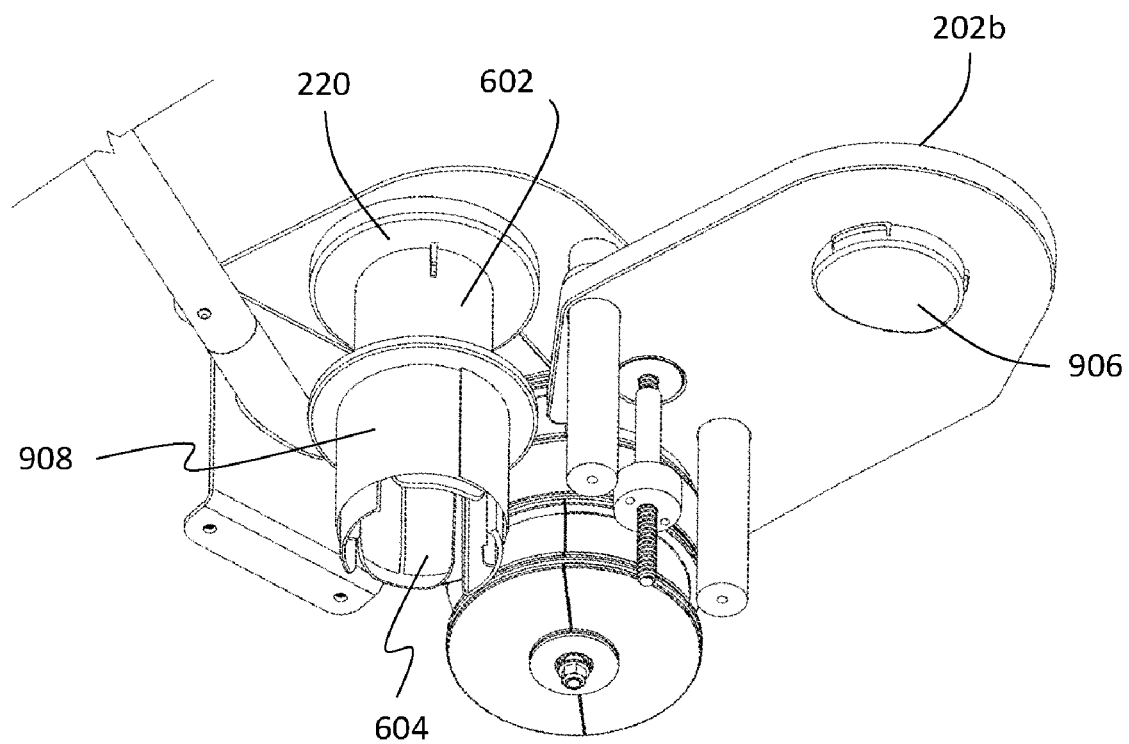
FIG. 9 is a right side elevated perspective view with right side cover and arm removed showing take-up reel in an extended position.

Referring now to FIG. 9, a partial right-side view with the right side cover and sidewall 202a removed. Sidewalls 202 include inwardly facing hubs or protrusions 906 shaped to support of a roll of adhesive tape (not shown) and permit rotation of the roll of adhesive tape to dispense tape along the sized path between the sidewalls and under the wheel to the surface. In embodiments, the roll of adhesive tape includes a cardboard core or cores made from other materials around which the tape is rolled. Protrusions 906 are sized and shaped to accommodate the core permitting rotation. FIG. 9 additionally illustrates liner take-up reel 220 in the extended position where the outer sleeve 604 extends beyond the right side cover (not shown) to facilitate removal of collected lining material 908 after tape application to a flooring surface.

Figure 10:
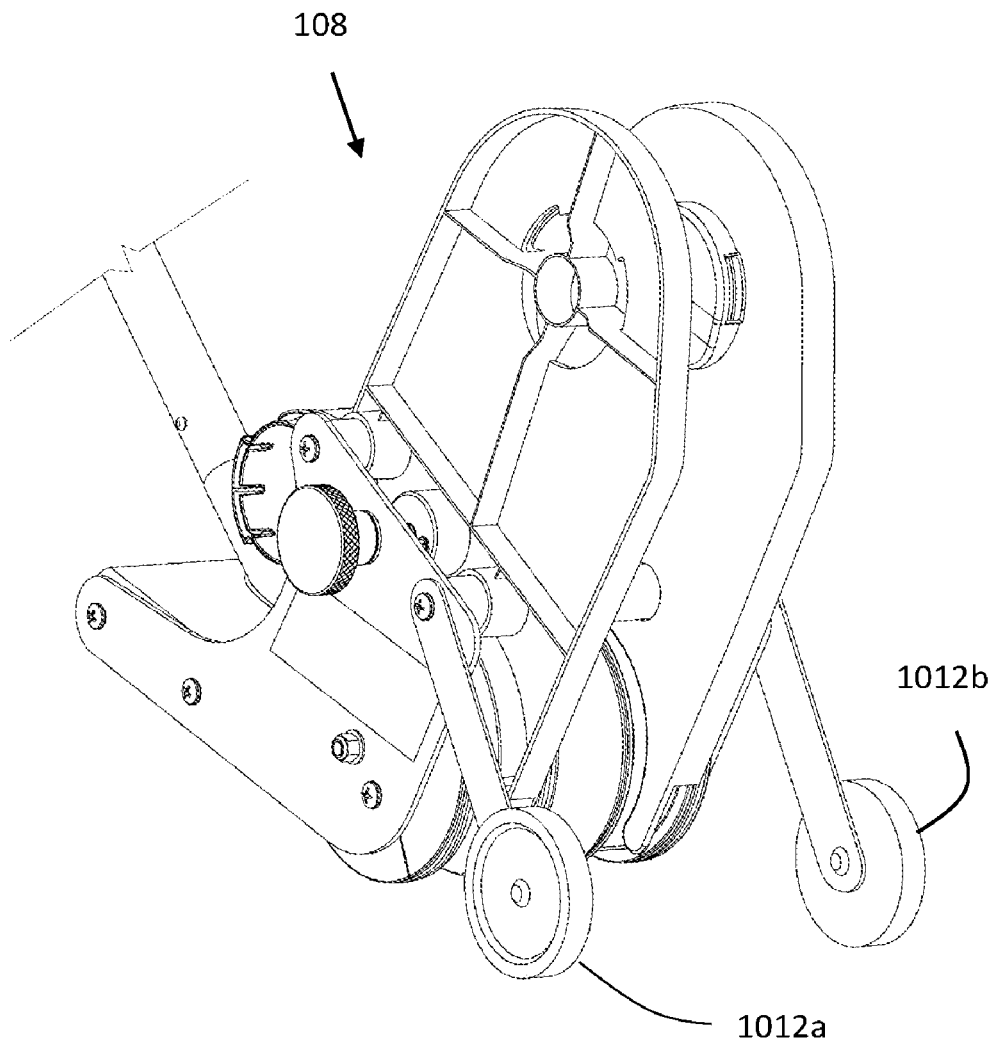
FIG. 10 is a right forward perspective view of a different embodiment of a tracking indicator.

With reference now to FIG. 10, other embodiments of an indicator include at least one additional wheel 1012a connected to the tape applicator 108 and extending ahead of the applicator 108. The wheels 1012a, 1012b singularly or together provide additional stability and also provide function of the indicator for a user to align with a guide while applying floor tape along a desired path on the surface.

Figure 11:
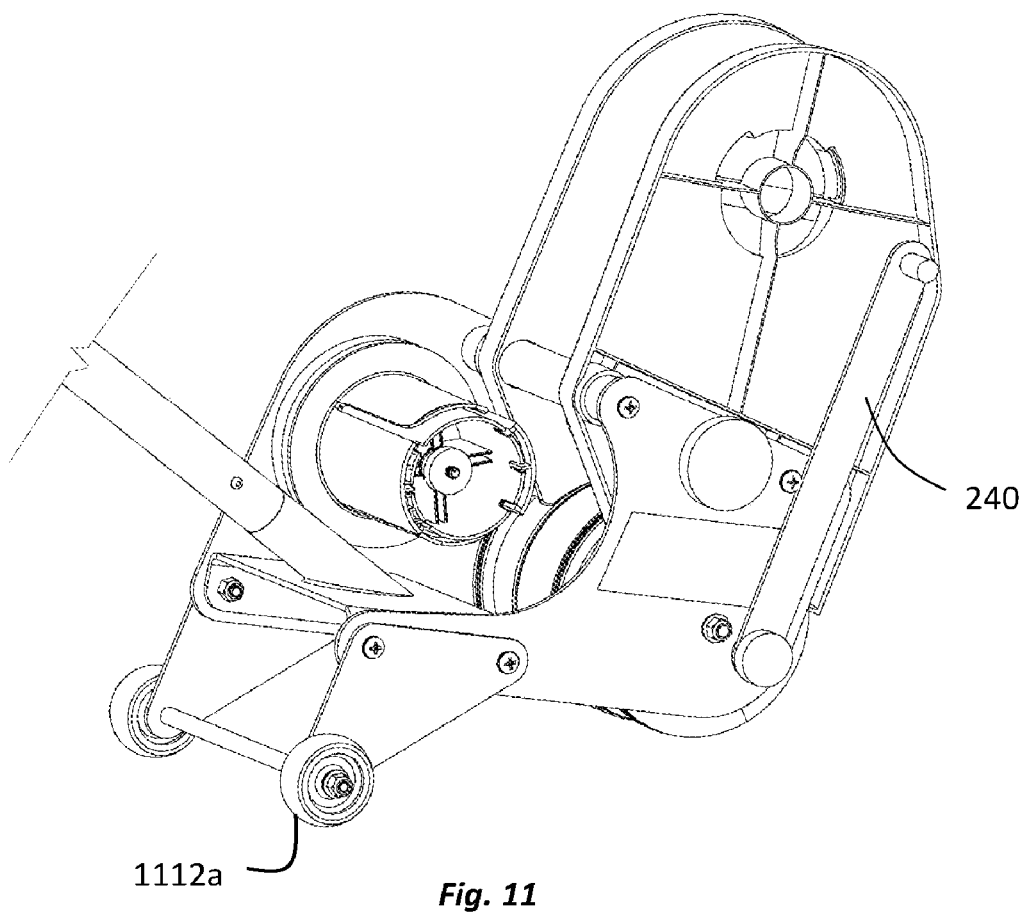
FIG. 11 is s a right rear perspective view of a different embodiment of a rear wheel support.

With reference now to FIG. 11, another embodiment includes both indicator 240, and rear mounted, at least one additional fixed wheel 1112a. The at least one additional wheel 1112a provides some added stability and improved tracking along the flooring surface as well as another reference to inform a user of fidelity of tape application with respect to the guide line. For example, a user desiring a straight line tape path may refer to the additional wheel 1112a and maintain a consistent spacing between the wheel 1112a and the applied tape and/or any guide line on the floor.

Figure 12:
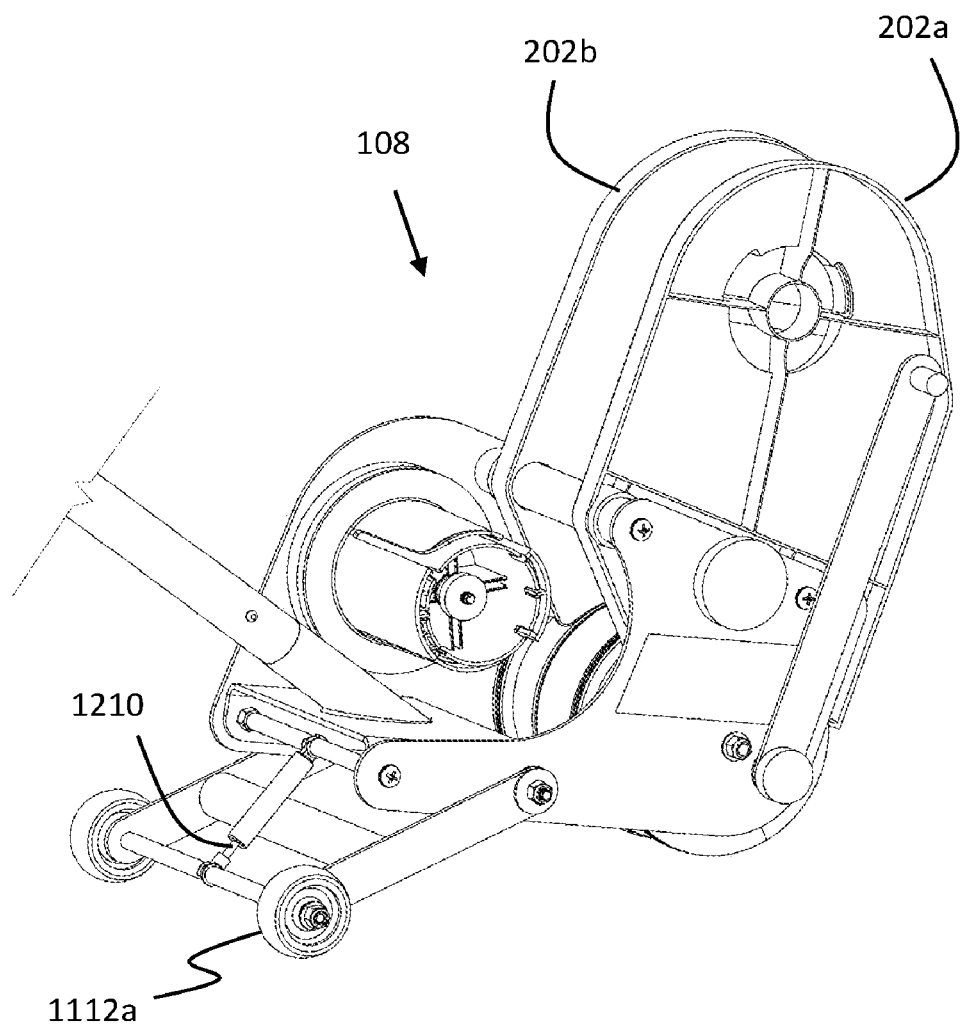
FIG. 12 is s a right rear perspective view of an alternate embodiment of a rear wheel support.

FIG. 12 illustrates an alternate arrangement for the at least one additional wheel 1112a, where an adjuster arm 1210 can set varying angles for the applicator 108 relative to the flooring surface. In the retracted position shown, the sidewalls 202a, 202b form a nearly perpendicular angle relative to the flooring surface, while in an expended position (not shown) the arms would form a more acute, smaller, angle relative to the flooring surface.

Figure 13:
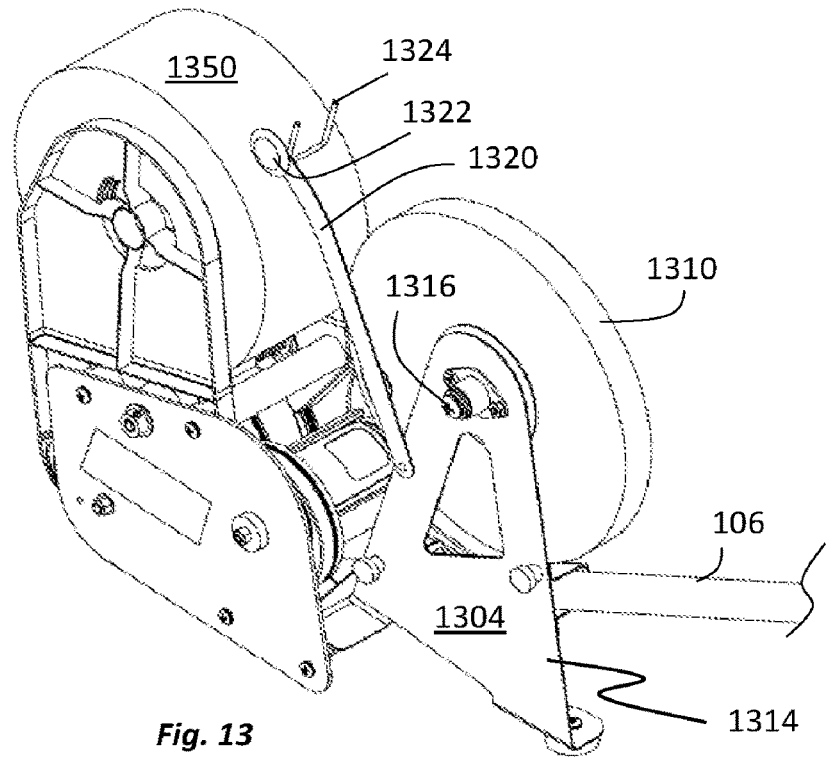
FIG. 13 is s a rear perspective view of an adapter to hold a second roll.

With reference now to FIG. 13, an adapter 1304 to support a second roll 1310 of tape, wire or other material is illustrated for connection to a tape applicator 108. Preferably, the tape, wire or other material comprises a detectable property, such as optical, electromagnetic, ferrous or the like to be detectable when installed beneath the floor tape. The adapter 1304 includes a frame 1314 that connects to the handle 106. A hub 1316 supporting the second roll 1310 of tape is positioned at a location sufficiently spaced from the handle to allow clearance and rotation of the second roll 1310. A guide arm 1320 attaches to the frame 1314 on one side and includes a tracking element, 1322 for example, a wheel, on the opposite side. Additionally, a guide 1324 is disposed on the opposite side and aligned substantially in the middle of the roll 1350 held by the applicator 108.

Figure 14:
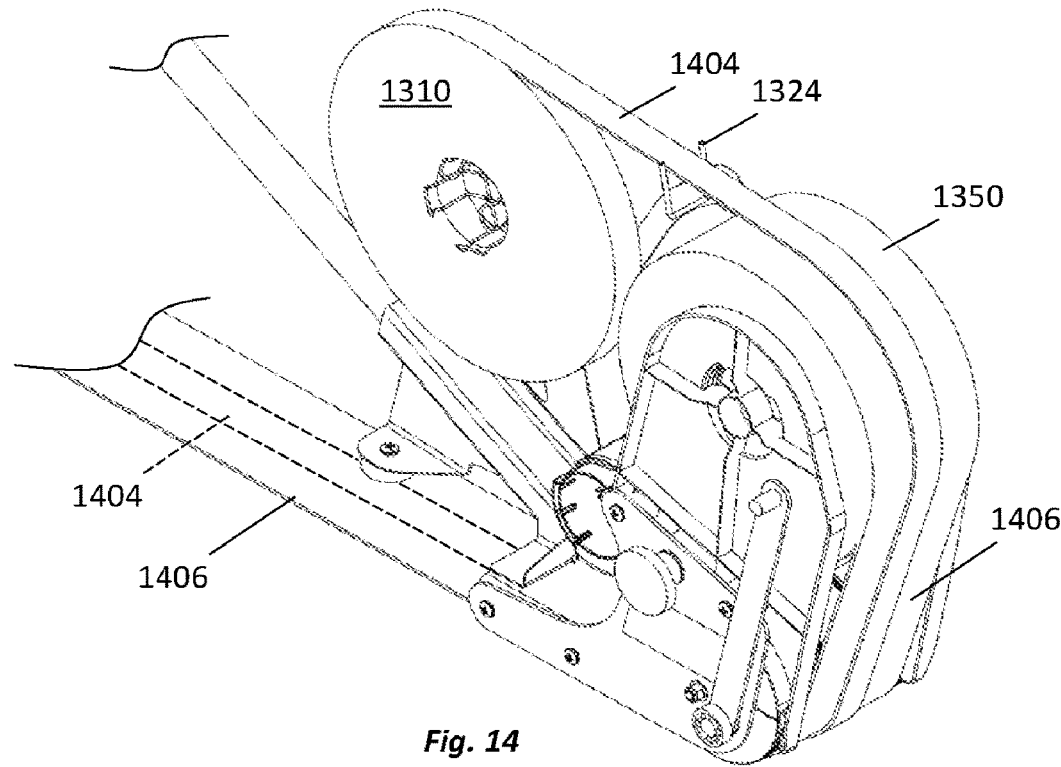
FIG. 14 is s a forward, right perspective view of an adapter applying a combination tape to a surface.

As best appreciated by reference to FIG. 14, in use, second tape, wire or other material 1404 is fed off roll 1310 and onto the middle of the adhesive side of roll 1350 on the applicator 108. A combination of second tape, wire or other material 1404 and tape 1406 from the roll 1350 travels along the path through the applicator onto the surface. In embodiments, second roll 1310 includes magnetic, metallic, electrical, optical or other properties that allow it to be sensed by robotic or manual machinery operating in a factory, healthcare or other facility. Specifically, a sensor on the machinery detects the second tape, wire or other material 1404 underneath the tape 1406 on the surface allowing robotic machinery to track along the path or providing alerts or prompting for manual machinery when it deviates from the path.

Referring to FIG. 15, a method of applying a tape to a floor surface includes an attaching step 1502 where a handle is assembled as needed and attached to a tape applicator. The method includes a manipulating step 1504 where a mechanism such as a screw drive controls positioning of the two sidewalls of a floor tape applicator and adjusts the sidewalls to accommodate a width of a roll of floor tape which is to be applied to the flooring surface. For example, the sidewalls can be adjusted to accommodate various widths of floor marking tape, for example, one, two, three, four and six inch-wide rolls of tape with or without a liner, one inch rolls of painters tape, two and a half inch rolls of duct tape and others. The method includes a loading step 1508 where the roll of floor tape is loaded between the sidewalls. In an embodiment, the roll of floor tape is supported by inward facing protrusions or hubs in the sidewalls which engage a core upon which the tape is rolled. The sidewalls may flex outward slightly to permit insertion of some tape rolls. Where tapes with liners are used, the tape may be rolled onto the cores finish side inward, or finish side outward. Where finish side is inward, the rolls are inserted so that the tape is dispensed from the roll over the top (FIG. 8). In finish side outward rolls, the rolls are inserted so that the tape is dispensed from the roll off the bottom (FIG. 7).

Continued reference to FIG. 15 shows the method includes an optional separating step 1510 where several feet of tape are advanced from the roll and the liner (if used) is separated from the tape backing to expose the adhesive. The liner is wrapped over the roll (in the case of a liner side down roll) and onto a take-up reel. In the case of a liner side up roll, the separated liner is guided directly onto the take-up reel. In one embodiment, the liner is fed through a tab or slit in an outer sleeve and the reel is manually advanced in the direction of rotation during forward motion of the applicator.

The method includes an applying step 1516 where the end of the tape is applied to the flooring surface in front of the floor tape applicator adhesive side down. The method includes a moving step 1518 where the floor tape applicator is moved atop the tape to a position where the tape is resting taut against the wheel. Preferably the applicator is lifted over the tape and placed atop as opposed to being rolled into position. The method includes a rolling step 1520 where a user rolls the applicator forward to apply a tape path on the flooring surface.

With reference now to FIG. 16, alternate or additional method steps include manipulating a mechanism to adjust sidewalls of an applicator, 1604. A roll of tape may then be loaded between the sidewalls, 1608. If used, the protective liner is separated from the tape backing, 1610. The liner may then be attached to a take-up reel, 1612. An end of the tape is applied to the surface where marking is desired, 1616. Optionally, an indicator is aligned with a guide on the surface, 1618. The guide provides the user with a desired path for applying the tape. In one embodiment, the indicator includes an indicator arm movable between a stored position and an extended position in front of the floor tape applicator. In another embodiment, the indicator includes a guide wheel or wheels positioned in front of or behind the floor tape applicator. Suitable guides on the flooring surface include a chalk line, a laser path, an existing seam or feature of the flooring surface, a painted or taped line, or other mechanisms to be referenced by the indicator to assist in applying the tape to a desired location. The user may then advance the applicator applying the tape to the flooring surface, 1620.

Figure 17:
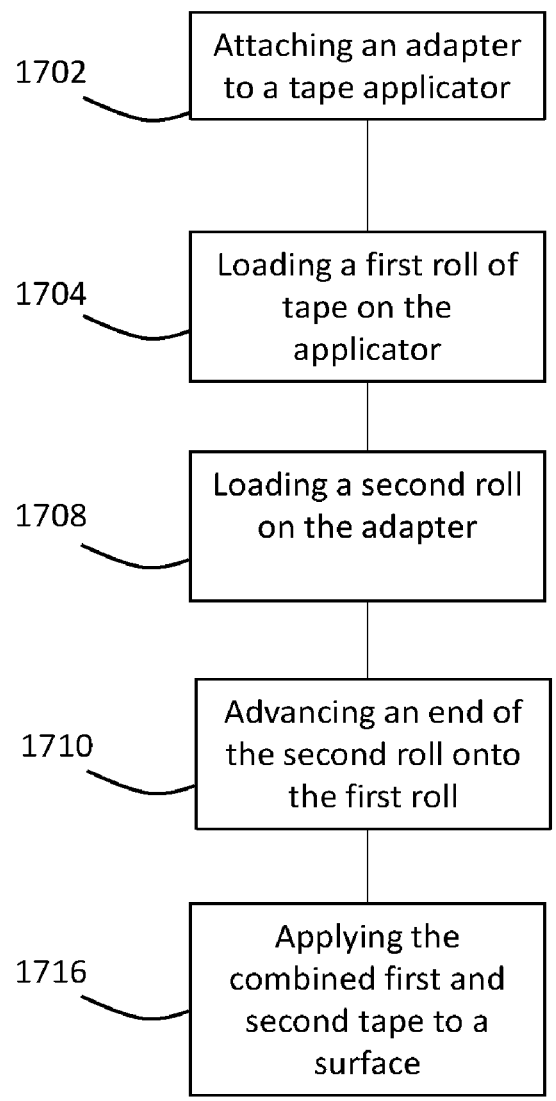
FIG. 17 shows a method of applying a tape.

With reference now to FIG. 17, one embodiment of a method includes attaching an adapter to a floor tape applicator 1702. For example, the adapter can attach to a handle on the floor tape applicator and include a hub to support a roll of tape, for example, having detectable properties. The method includes loading a first roll of tape on the applicator 1704 and loading a second roll of tape, wire or other material on the adapter 1708. In an embodiment, the first roll of tape has a width of 4-6 inches and the second roll has a width of an inch or less. The method includes advancing an end of the second roll of tape, wire or other material onto an adhesive side of the first roll, 1710, and subsequently applying the combined first tape and second tape, wire or other material to a surface, 1716. For example, the surface can be locations where machinery can operate autonomously or where machinery includes sensors to provide path following feedback to an operator.

In other embodiments, a kit is provided including a handle and a floor tape applicator and optionally an adapter as described above and instructions describing any or all of assembly, preparation, use and storage. The instructions can include some or all of the methods described here and may be provided on printed materials, on-line videos, apps, and the like. The kit may also include one or more rolls of tape suitable for application to a floor surface, a chalk line, laser or other guide for application to the floor and one or more rolls of second tape, wire or other material.

Those skilled in the relevant art will recognize that many changes can be made to the several aspects described, while still obtaining the beneficial results shown and described. It will also be apparent that some of the desired benefits can be obtained by selecting some of the features without utilizing other features. Accordingly, those who work in the art will recognize that many modifications and adaptations are possible and can even be desirable in certain circumstances and are a part of the present disclosure. Thus, the description is provided as illustrative of certain principles and not in limitation thereof.

As used herein, the singular forms "a," "an" and "the" include plural referents unless the context clearly dictates otherwise. Thus, for example, reference to a "wheel" includes aspects having two or more wheels unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Terms used herein, such as "exemplary" or "exemplified," are not meant to show preference, but rather to explain that the aspect discussed thereafter is merely one example of the aspect presented.

Additionally, as used herein, relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

As used herein, "connection" or "connected" means both directly, that is, without other intervening elements or components, and indirectly, that is, with another component or components arranged between the items identified or described as being connected. To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the claims (e.g., A or B) it is intended to mean "A or B or both." When the applicants intend to indicate "only A or B but not both" then the term "only A or B but not both" will be employed. Similarly, when the applicants intend to indicate "one and only one" of A, B or C, the applicants will employ the phrase "one and only one." Thus, use of the term "or" herein is the inclusive, and not the exclusive use. See, Bryan A. Garner, A Dictionary of Modern Legal Usage 624 (2d. Ed. 1995). To the extent that the phrase "one or more of A, B and C" is employed herein, (e.g., storage for one or more of A, B and C) it is intended to convey the set of possibilities A, B, C, AB, AC, BC, and/or ABC (e.g., the storage may store only A, only B, only C, A&B, A&C, B&C, and/or A&B&C). It is not intended to require one of A, one of B, and one of C. When the applicants intend to indicate "at least one of A, at least one of B, and at least one of C," then the phrasing "at least one of A, at least one of B, and at least one of C" will be employed.

We claim:

1. A method of applying tape to a surface, the method comprising:
   Manipulating a mechanism connected to two sidewalls of a tape applicator to adjust positioning of the sidewalls to accommodate a width of a roll of tape to be applied to the surface;
   Inserting the roll of tape between the sidewalls so the roll of tape is supported by protrusions in the sidewalls and an end of tape is supplied from the roll between the sidewalls;
   Separating a liner from the end of tape and onto a take-up reel;
   Applying the end of tape separated from the liner to the surface in front of the tape applicator;
   Attaching an adapter to the tape applicator, where the adapter supports a second roll having detectable properties and where second tape from the second roll is applied to the end of the tape separated from the liner;
   Moving the tape applicator over the end of tape applied to the surface; and
   Continuing moving the tape applicator along a path applying both the tape and the second tape to the surface.

2. The method of applying tape to a surface as set forth in claim 1, further comprising attaching a handle to the tape applicator where user interaction with the handle orients the tape applicator in an orientation relative to the surface upon which application of tape is desired, where the user interaction upon the handle moves tape applicator in a direction along the surface.

3. The method of applying tape to a surface as set forth in claim 1, further comprising aligning an indicator positioned in front of the tape applicator with a guide on the surface.

4. The method of applying tape to a surface as set forth in claim 1, further comprising extending an outer sleeve of the take-up reel beyond a side of the tape applicator for removal of collected liner.

* * * * *